(12) United States Patent
Ahn et al.

(10) Patent No.: US 8,437,146 B2
(45) Date of Patent: May 7, 2013

(54) PORTABLE TERMINAL WITH HINGE APPARATUS

(75) Inventors: Sung-Ho Ahn, Seoul (KR); Won-Tae Kim, Gyeonggi-do (KR); Han-Gyu Hwang, Seoul (KR); Pil-Je Cho, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 240 days.

(21) Appl. No.: 12/908,083

(22) Filed: Oct. 20, 2010

(65) Prior Publication Data

US 2011/0157843 A1    Jun. 30, 2011

(30) Foreign Application Priority Data

Dec. 29, 2009    (KR) .................. 10-2009-0132945

(51) Int. Cl.
*H04B 1/03*        (2006.01)
*H05K 5/02*        (2006.01)

(52) U.S. Cl.
USPC ........................................ 361/814; 361/755

(58) Field of Classification Search .... 455/575.1–575.3; 361/728–730, 752, 715, 755, 796, 800
See application file for complete search history.

(56) References Cited

U.S. PATENT DOCUMENTS

| | | | | |
|---|---|---|---|---|
| 6,650,547 B2 * | 11/2003 | Hemmi et al. | ................ | 361/755 |
| 7,006,853 B2 * | 2/2006 | Kang et al. | ................. | 455/575.3 |
| 7,133,280 B2 * | 11/2006 | Love | ........................ | 361/679.07 |
| 7,168,136 B2 * | 1/2007 | Gan | ................. | 16/367 |
| 7,266,864 B2 * | 9/2007 | Kim | ............................... | 16/367 |
| 7,369,414 B2 * | 5/2008 | Kim | ............................... | 361/752 |
| 7,949,312 B2 * | 5/2011 | Takagi | ........................ | 455/90.3 |

FOREIGN PATENT DOCUMENTS

| | | |
|---|---|---|
| JP | 2005-90602 | 4/2005 |
| KR | 2007-102919 | 10/2007 |
| KR | 2007-107296 | 11/2007 |

* cited by examiner

*Primary Examiner* — Hung S Bui
(74) *Attorney, Agent, or Firm* — Cha & Reiter, LLC (57) ABSTRACT

A portable terminal includes: a first housing; a second housing coupled to the first housing via a hinge device, the second housing pivoting about a first hinge axis toward or away from the first housing to be closed or opened, and rotating about a second axis, so that the front and rear sides of the second housing are reversed, the second axis extending perpendicular to the first axis. The hinge includes: a hinge housing extending along the direction of the first hinge axis and coupled to the first housing in such a manner that the hinge housing is rotated about the first hinge axis on the first housing; and a coupling member anchored to the second housing and coupled to the hinge housing to be rotatable about the second hinge axis. While the hinge housing is being rotated about the first hinge axis, the coupling member is turned around the first hinge axis in a state in which one side of the coupling member is faced to the outer peripheral surface of the hinge housing.

19 Claims, 10 Drawing Sheets

PORTABLE TERMINAL WITH HINGE APPARATUS

CLAIM OF PRIORITY

This application claims the priority under 35 U.S.C. §119(a) of an application entitled "Portable Terminal With Hinge Apparatus" filed in the Korean Intellectual Property Office on Dec. 29, 2009 and assigned Ser. No. 10-2009-0132945, the contents of which are hereby incorporated by reference.

BACKGROUND OF THE INVENTION

1. Field of the Invention

The present invention relates to a portable terminal, and more particularly to a portable terminal with a pair of housings pivotably coupled to each other through a hinge in such a manner that the housings can be opened or closed, wherein the front and rear sides of the housings can be rotated/reversed during the open state.

2. Description of the Related Art

In general, a portable terminal is classified into a bar-type, a flip type or a folder-type terminal.

A bar-type terminal has a single body housing which is provided with data input and output means, and transmission and reception units. Such a bar-type terminal is disadvantageous in that a keypad serving as the data input means is always exposed, which may cause a malfunction, and difficult to be miniaturized due to a problem of shortening a distance between the transmission and reception units.

A flip-type terminal has a body, a flip, and at least one hinge module for interconnecting the body and the flip. The flip covers a keypad serving as the data input means so that a malfunction can be prevented. However, such a flip-type terminal can also be hardly miniaturized due to a problem of shortening a distance between the reception and transmission units.

A folder-type terminal has a body, a folder, and at least one hinge module for rotatably interconnecting the body and the folder in such a manner that the terminal is opened or closed as the folder pivots. In a standby mode, since the folder is in close contact with the body, a possible malfunction of the keypad of the terminal can be prevented, whereas in a talk mode, since the folder is extended, a sufficient distance can be secured between the transmission and reception units of the terminal, which is advantageous in miniaturization. For these reasons, folder-type terminals have become most widely used among the above-mentioned various types of terminals.

As the users' tastes are diverse, the sliding-type terminals are more popularized than the folder-type terminals.

In mobile communication services, services provided through the portable terminals are being gradually diversified, especially in view of enhancement of multimedia functions. For example, it is now possible to download or enjoy games online using a portable terminal, and to download and reproduce digital multimedia broadcasting, moving pictures, or music files, etc. Furthermore, banking services, such as a credit card function using a subscriber identification module (SIM), are also being gradually commercially available.

However, since the external appearances of the conventional portable terminals have been developed to be suitable for performing communication functions, such as voice communication and message transmission, the portable terminals have a disadvantage in that they are inconvenient in multimedia applications and services or the like. For example, since display devices are longitudinally set in the conventional portable terminals, it is inconvenient to watch a digital multimedia broadcasting (DMB), a moving picture file or the like. Furthermore, a folder-type terminal has a disadvantage in that it is necessary to maintain the housings thereof in the extended state when watching a broadcasting or a moving picture file.

SUMMARY OF THE INVENTION

Accordingly, the present invention has been made to solve the above-mentioned problems occurring in the prior art and provides additional advantages, by providing a portable terminal which can be also conveniently used in a multimedia function, for example, for watching a moving picture.

Also, the present invention provides a portable terminal with a hinge apparatus which can maximize a space for installing a display apparatus in a housing of the terminal by minimalizing a space for installing the hinge device in the housing of the terminal.

In addition, the present invention provides a portable terminal with a hinge apparatus, which allows easy wiring of a flexible printed circuit board, while coupling a pair of housings to be rotatable about two hinge axes.

In accordance with an aspect of the present invention, there is provided a first housing including; a second housing coupled to the first housing, the second housing pivoting about a first hinge axis toward or away from the first housing to be closed or opened, and being rotated about a second axis, so that the front and rear sides of the second housing are reversed, the second axis extending perpendicular to the first axis; and a hinge apparatus for coupling the second housing to the first housing.

The inventive hinge apparatus includes: a hinge housing extending along the direction of the first hinge axis and coupled to the first housing in such a manner that the hinge housing is rotated about the first hinge axis on the first housing; and a coupling member anchored to the second housing and coupled to the hinge housing to be rotatable about the second hinge axis. When the hinge housing is being rotated about the first hinge axis, the coupling member turns around the first hinge axis in a state in which one side of the coupling member is in contact with an outer peripheral surface of the hinge housing.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE INVENTION

Hereinafter, exemplary embodiments of the present invention will be described with reference to the accompanying drawings. For the purposes of clarity and simplicity, a detailed description of known functions and configurations incorporated herein will be omitted as it may make the subject matter of the present invention rather unclear.

Figure 1:
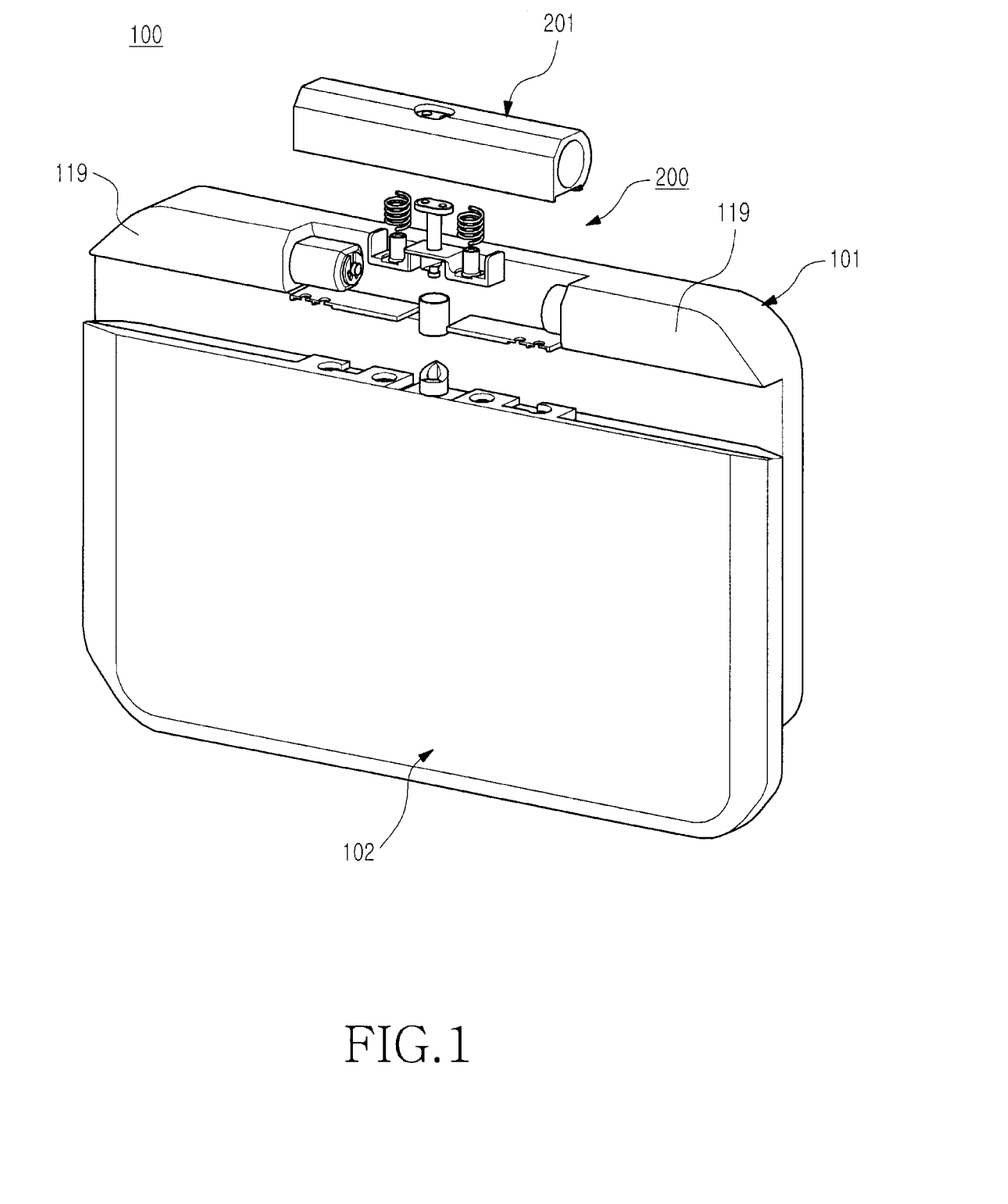
FIG. 1 is an exploded perspective view showing a portable terminal in accordance with an embodiment of the present invention.
Figure 14:
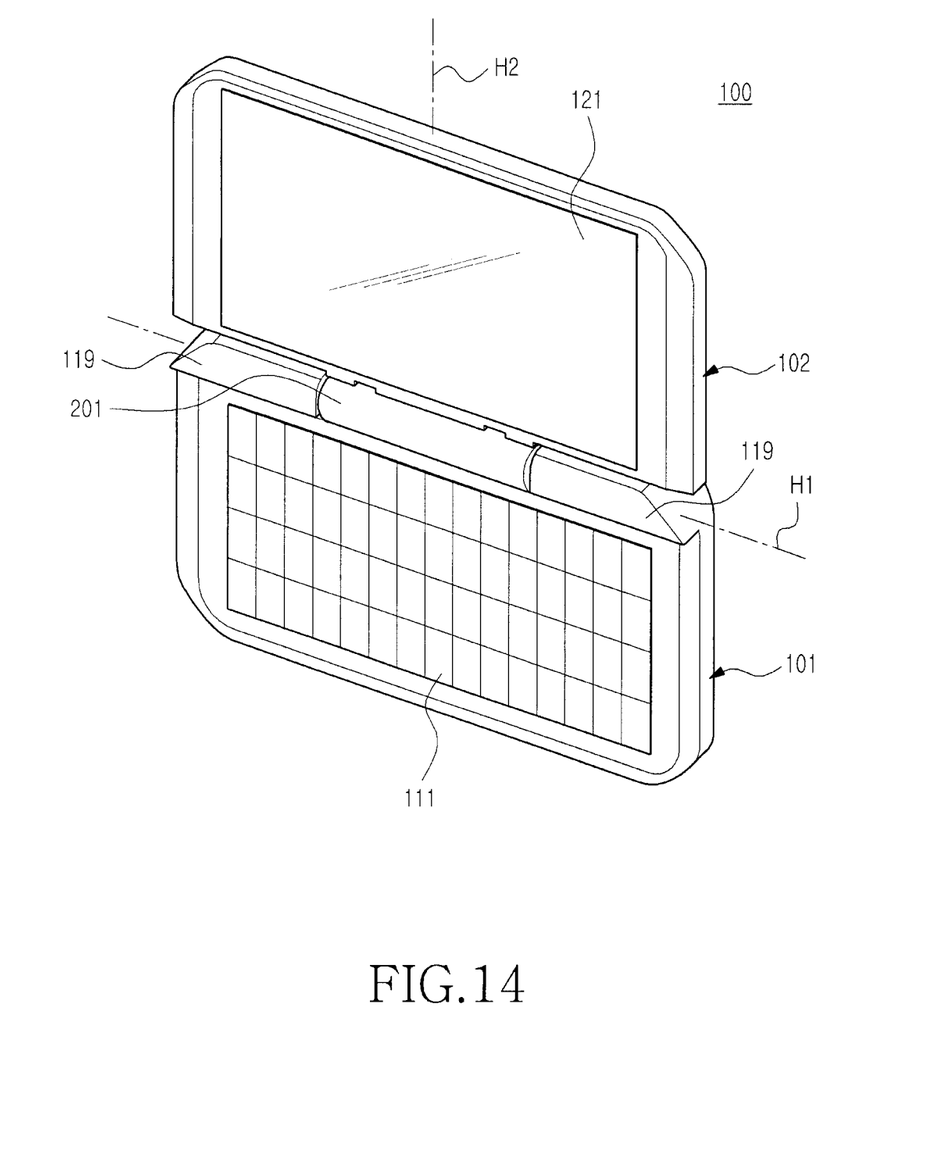
FIG. 14 is a perspective view showing the portable terminal of FIG. 1 opened after the second housing of the terminal pivots.
Figure 15:
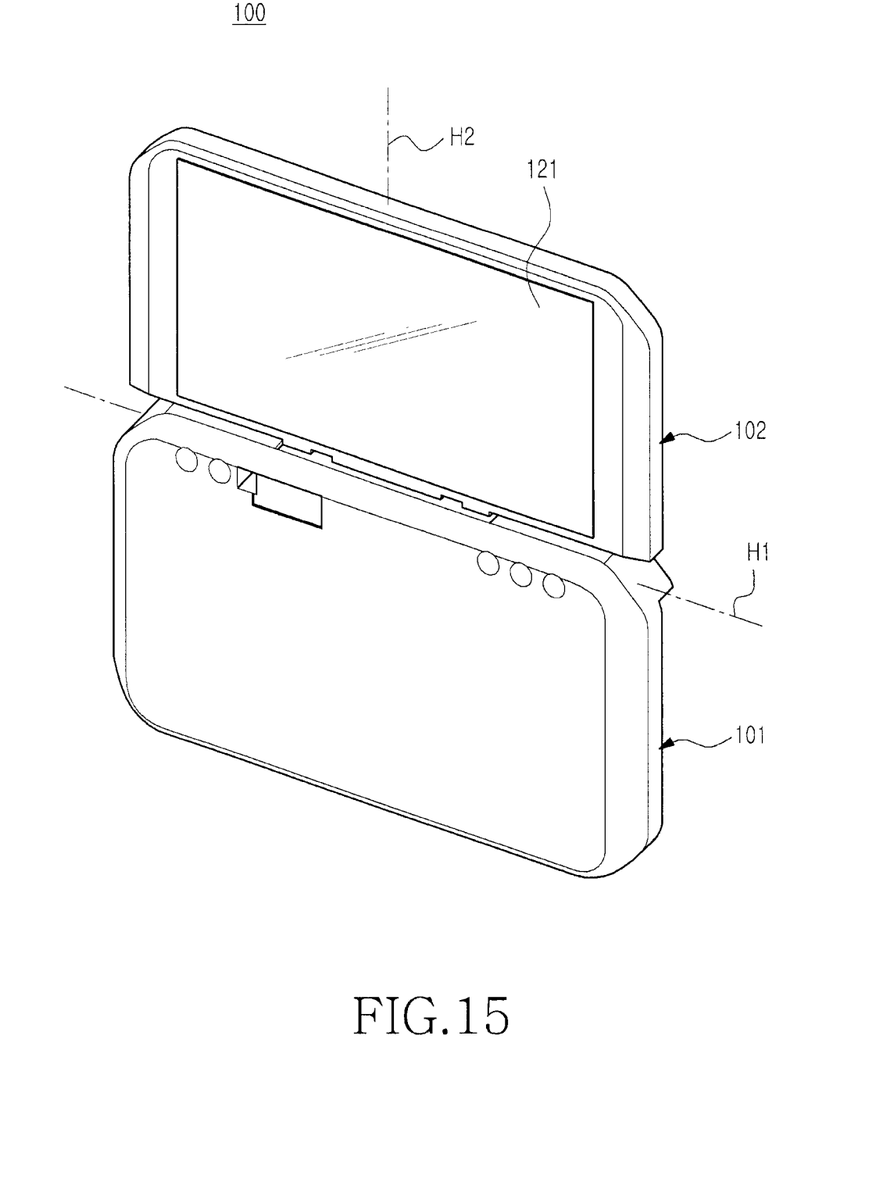
FIG. 15 is a perspective view showing the portable terminal with the front and rear sides of the second housing of FIG. 14 being reversed.

Referring to FIGS. 1, 14 and 15, a portable terminal 100 according to an embodiment of the present invention includes: a first housing 101; a second housing 102 coupled to the first housing 101 in such a manner that the second housing 102 pivots about a first hinge axis H1 toward or away from the first housing 101 for closing and opening; and a hinge apparatus 200 for coupling the first housing 101 and the second housing 102.

In the state in which the second housing 102 is opened after pivoting away from the first housing 101, the second housing 102 can be rotated about a second hinge axis H2 so that its front and rear sides can be reversed. That is, the hinge apparatus 200 provides a pair of hinge axes. Only after the second housing 102 pivots about the first hinge axis H1 away from the first housing and is opened, the second housing 102 can be then rotated about the second hinge axis H2.

The first housing 101 is provided with a keypad 111 on one side thereof, and a battery pack (not shown) is mounted on the other side thereof. The battery pack may be concealed using a separate cover. A pair of side hinge arms 119 is provided at one edge of the first housing, and the hinge apparatus 200. In particular, the hinge housing 201 of the hinge apparatus 200 is fitted between the hinge arms 119. The keypad 111 is selectively opened as the second housing 102 pivots about the first hinge axis H1. The second housing 102 also has a display device 121 mounted on one side thereof.

Figure 2:
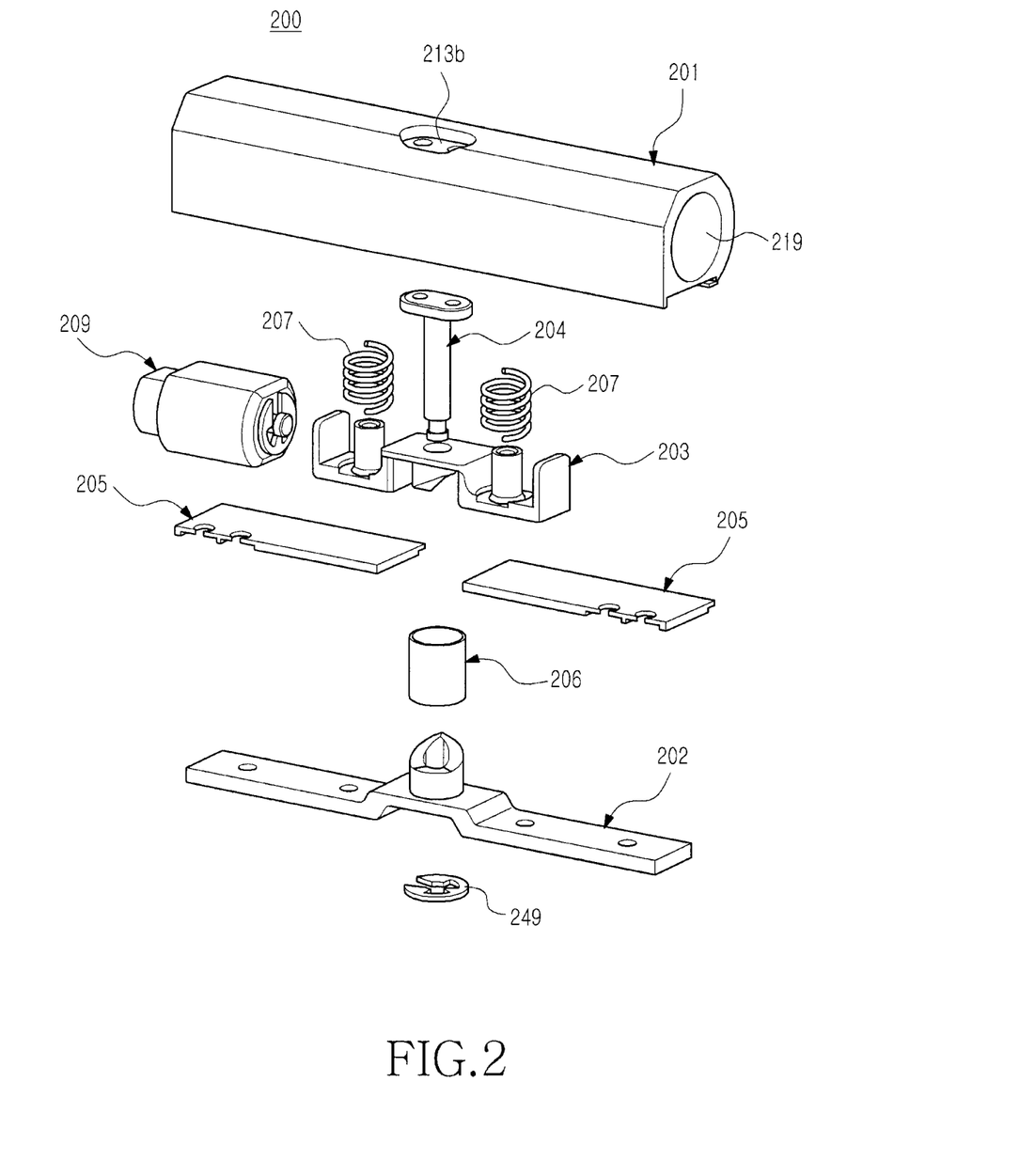
FIG. 2 is an exploded perspective view showing a hinge apparatus of the portable terminal shown in FIG. 1.

Referring to FIG. 2, the hinge apparatus 200 includes a hinge housing 201 rotatable about the first hinge axis H1, and a coupling member 202 fixed to the second housing 102 and coupled to the hinge housing 201 to be rotatable about the second hinge axis H2. The coupling member 202 is coupled to the second housing 201 in such a manner that one side of the coupling member 202 is in contact with an outer peripheral surface of the hinge housing 201, and the coupling member 202 turns around the first hinge axis H1 when the hinge housing 201 pivots about the hinge axis H1.

Figure 3:
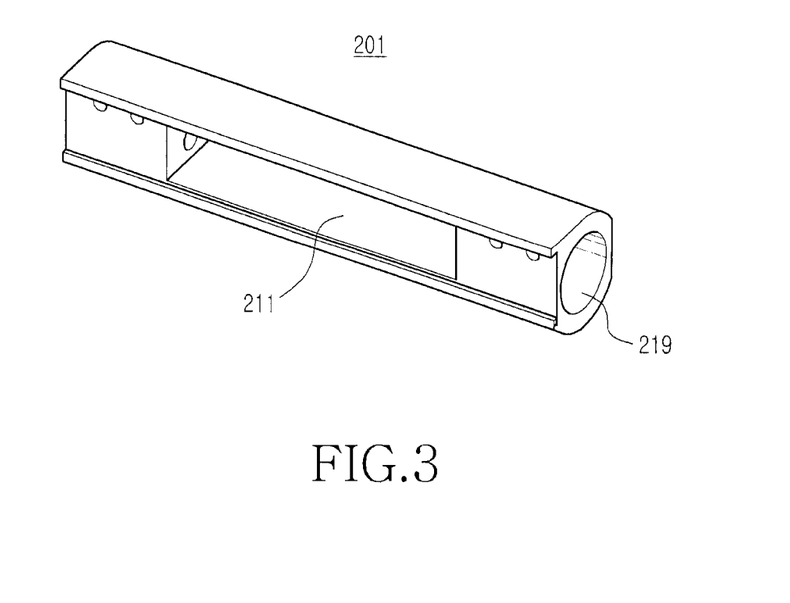
FIG. 3 is a perspective view showing a hinge housing of the hinge apparatus shown in FIG. 2.
Figure 4:
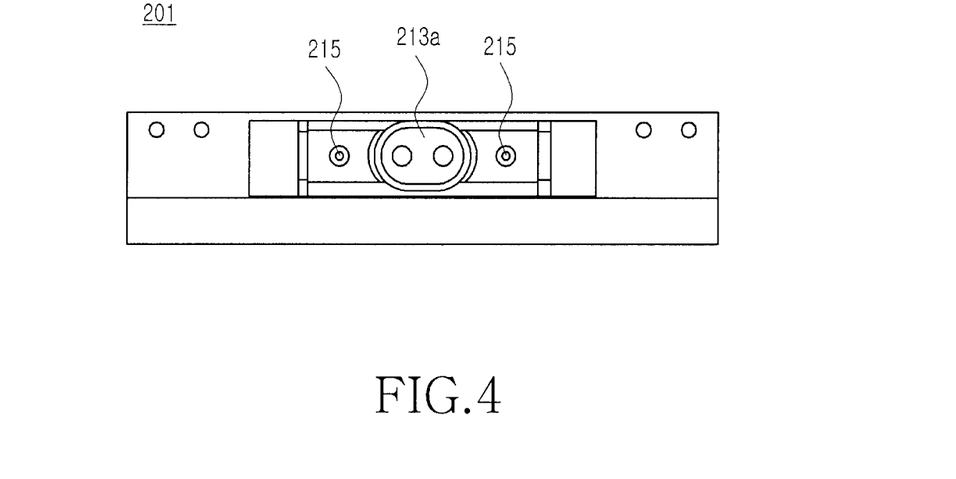
FIG. 4 is a top plan view showing the internal construction of the hinge housing shown in FIG. 3.

Referring to FIGS. 3 and 4, the hinge housing 201 has a cylindrical shape extending in the direction of the first hinge axis H1 and opened at the opposite ends thereof. The hinge housing 201 has a flat portion on the outer periphery thereof and has an opening 211 formed by partially removing the flat portion. A part of the inner wall of the hinge housing 201 exposed through the opening 211, i.e. the part which is seen when observing the interior of the hinge housing 201 through the opening 211 along the second hinge axis H2, is depressed, thereby providing a seating surface 213a. At the opposite sides of the seating surface 213a, a pair of second support protrusions 215 is formed, wherein the second support protrusions 215 extend parallel to the second hinge axis H2. In cooperation with a pair of first support protrusions 239 to be described later, the second support protrusions 215 support elastic members 207, and guide the reciprocal movement of a cam member 203 while limiting the rotation of the cam member 203.

The internal space of the hinge housing 201 may be hollow along the direction of the first hinge axis H1. However, it is possible to form various forms of partitions within the internal space so as to enhance the structural strength of the hinge housing 201. In addition, if the partitions are formed within the hinge housing 201, they can be used as support structures on which a hinge module 209 to be described later and the cam member 203 can be stably installed. In addition, the opposite end spaces 219 of the hinge housing 201 will provide means for coupling the hinge module 209 and a hinge dummy 291 (see FIG. 11).

Figure 5:
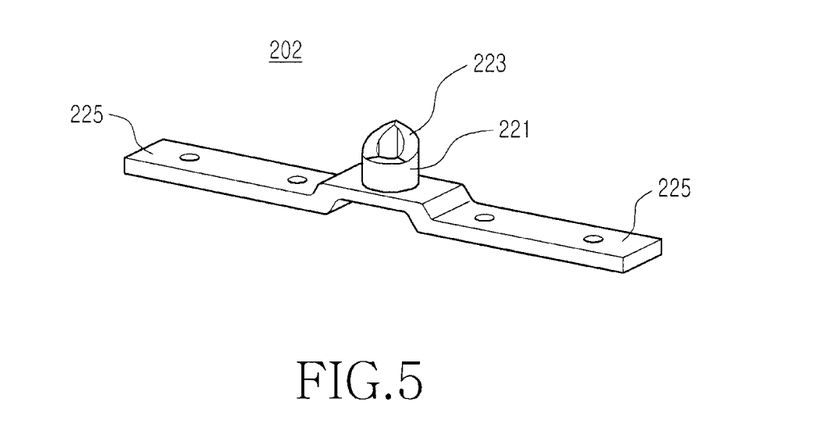
FIG. 5 is a perspective view showing a coupling member of the hinge apparatus shown in FIG. 2.
Figure 6:
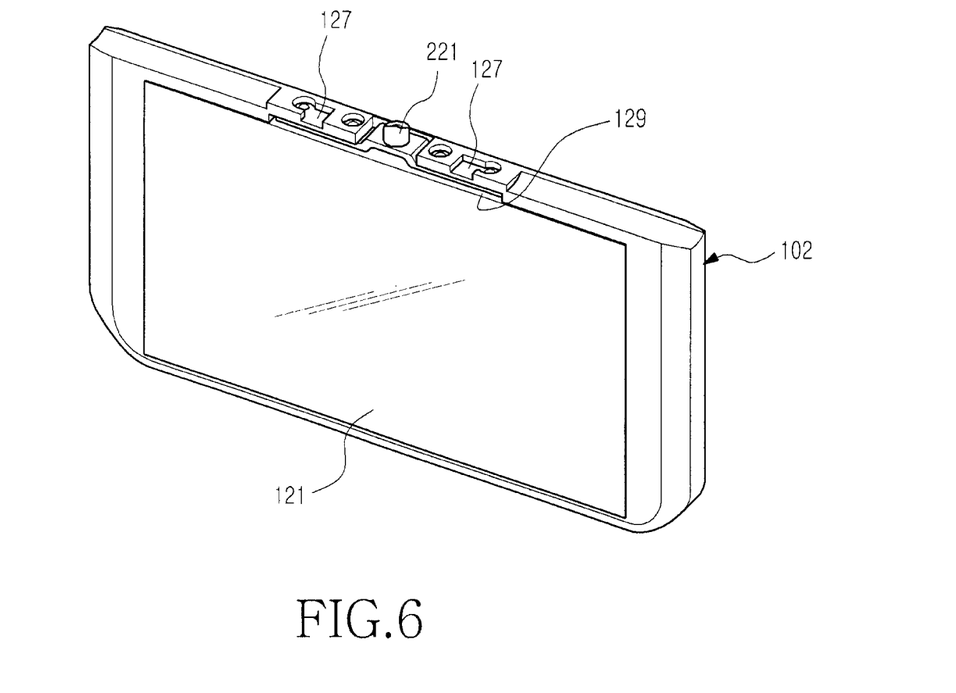
FIG. 6 is a perspective view showing the coupling member of FIG. 5 installed in a second housing.

The coupling member 202 shown in FIG. 5 is also shown in FIG. 6 in the state in which it is installed in the second housing 102. The coupling member 202 has an elongated shape and has a bent part. A second mountain-shaped part 221 is formed on one surface of the bent part. The second mountain-shaped part 221 comes into slide-contact with an inclined surface 233b of a first mountain shaped part 233a of the cam member 203, which will be described later, and converts the elastic force of the elastic member 207 into rotational force. The coupling member 202 is coupled to the second housing 102 through a slit 129 formed at one end of the second housing 102, and is anchored by separate screws. The screws may be screwed through the opposite extensions 225 of the second mountain-shaped part 221.

Although it is described above that the coupling member 202 faces the outer periphery of the hinge housing, a part of the second housing 102 is interposed between the coupling member 202 and the hinge housing 201 since the coupling member 202 is fitted in the slit 129 in the state in which the first and second housings 101 and 102 are coupled together. When the coupling member 202 is coupled to the second housing 102, the second mountain-shaped part 221 protrudes from an edge of the second housing 102, whereas when the coupling member 202 is coupled to the hinge housing 201, the second mountain-shaped part 221 is positioned within the hinge housing 201.

Figure 7:
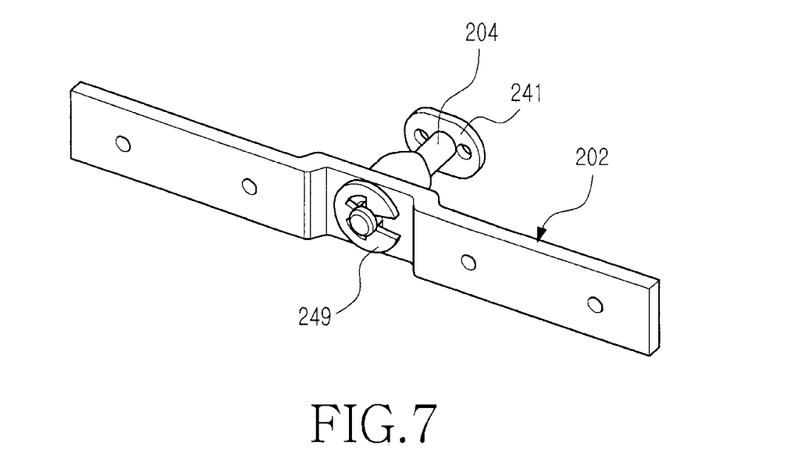
FIG. 7 is a perspective view showing the coupling member of FIG. 5 tied to a coupling shaft.

Meanwhile, the hinge apparatus 200 includes a coupling shaft 204 so as to couple the coupling member 202 to the hinge housing 201. The coupling shaft 204 extends in the direction of the second hinge axis H2, and has a seating member 241 at one end, which is engaged with the seating surface 213a. At least one screw may be used so as to anchor the coupling shaft 204 to the hinge housing 201, wherein the screw may be screwed from the outside of the hinge housing 201 and fastened to the seating member 241 on the seating surface 213a. If the seating surface 213a and the seating member 241 are formed in a polygonal or oval shape, the coupling position of the coupling shaft can be easily set.

In order to prevent the head of the screw for fixing the seating member 241 to the seating surface 213a from protruding out of the hinge housing 201, a reception recess 213b is formed on the outer peripheral surface of the hinge housing 201, wherein the reception recess 213b is positioned to correspond to the seating surface 213a. The other end of the coupling shaft 204 extends along the direction of the second hinge axis H2 through the coupling member 202, in particular through the second mountain-shaped part 221 to the other side of the coupling member 202, and an anchoring member 249 is fitted on the extended part of the coupling shaft 204. An E-ring or a C-ring may be used as the anchoring member 249, whereby the coupling member 202 is tied to the hinge housing 201 by the coupling shaft 204.

Consequently, the hinge housing 201 is installed between the side hinge arms 119 through the hinge module 209 or the hinge dummy 291 provided at the opposite ends of the hinge housing 201, respectively, so that the hinge housing 201 can pivot about the first hinge axis H1. And, the coupling member 202, which has been coupled to the second hinge housing 201 in the state of being fixed to the second housing 102, can be rotated about the second hinge axis H2. As the hinge housing 201 is rotated about the first hinge axis H1, the second housing 102 pivots toward or away from the first housing 101, and in the state in which the terminal is opened, the second housing 102 may be rotated about the second hinge axis H2 together with the coupling member 202, so that the front and rear sides of the second housing 102 can be reversed.

By using a hinge module disclosed the applicant's Korean Patent No. 296,038 (corresponding to U.S. Pat. No. 6,292, 980), the hinge module 209 may provide driving force while the second housing 102 pivots about the first hinge axis H1. Therefore, a detailed description of the hinge module 209 will be omitted to avoid redundancy.

Meanwhile, the hinge apparatus 200 may produce driving force while the second housing 102 is pivoting about the second hinge axis H2, if the hinge apparatus 200 is provided with the cam member 203 and elastic members 207. In addition, the hinge apparatus 200 is preferably provided with cover members 205, so that the opening 211 of the hinge housing 201 is closed in the completed hinge apparatus 200.

Figure 8:
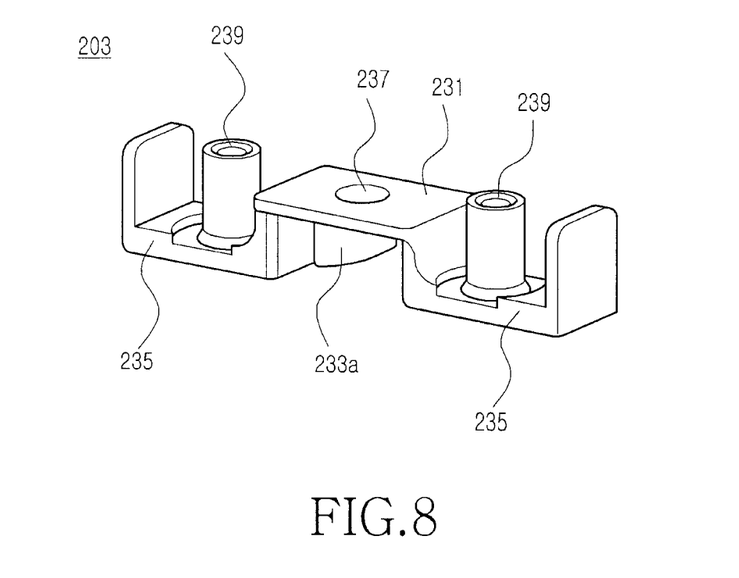
FIGS. 8 and 9 are perspective views showing cam members of the hinge apparatus of FIG. 2, respectively.
Figure 9:
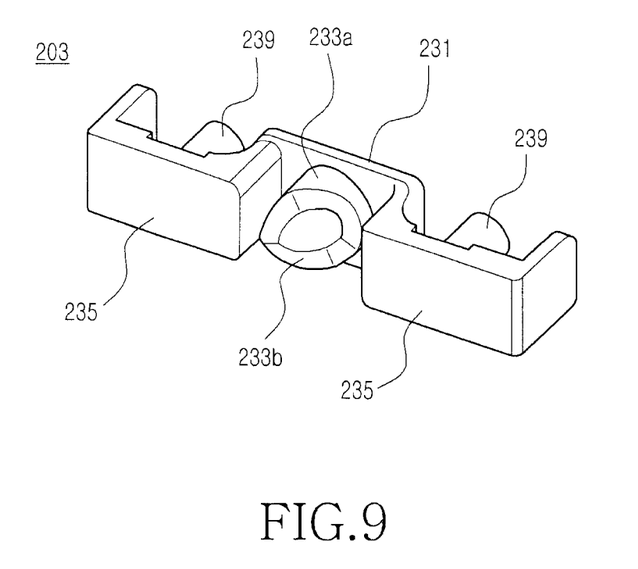
Figure 10:
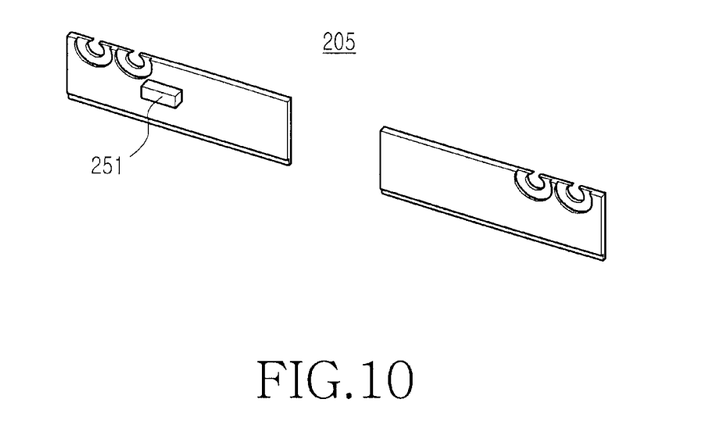
FIG. 10 is a perspective view showing cover members of the hinge apparatus of FIG. 2.

These components will be described with reference to FIGS. 8 and 10 as well as FIG. 2.

The cam member 203 is assembled to the inner side of the hinge housing 201 through the opening 211 of the hinge housing 201, wherein the cam member 203 has a body 231, which is formed with a first mountain-shaped part 233a on one side thereof, and support bodies 235 which extend away from each other from the opposite sides of the body 231. The body 231 has a through-hole 237 extending through the second mountain-shaped part 221 along the direction of the second hinge axis H2. The support bodies 235 have first protrusions 239 extending opposite to the second mountain-shaped part 221, respectively. When the cam member 203 is coupled to the hinge housing 201, the second support protrusions 215 are inserted in the first hinge protrusions 239, thereby limiting the rotation of the cam member 203 and guiding a reciprocal movement of the cam member 203 in the direction of the second hinge axis H2. When the cam member 203 is assembled to the inner side of the hinge housing 201, the coupling shaft 204 extends through the through-hole 237 and is engaged with the cam member 203.

In the above, structures, such as partitions, may be formed within the hinge housing 201. If the ends of the support bodies 235 are bent so that they can interfere with the structures within the hinge housing 201, they may limit the rotation of the cam member 203.

Each of the elastic members 207 is supported, at one end thereof, by the inner wall of the hinge housing 201 and, at the other end, by the cam member 203, in particular by any of the support bodies, so that the elastic members 207 provide elastic force acting in the direction of making the opposite ends thereof be away from each other. If both the coupling member 202 and the cam member 203 are assembled to the hinge housing 201, the inclined surface 223 of the second mountain-shaped part 221 faces and is in contact with the inclined surface of the first mountain-shaped part 233a, and the elastic force of the elastic members 207 is applied in a direction of making the cam member 203 come into close contact with the coupling member 202. Consequently, the coupling member 202 is rotated in the direction of making the top dead point of the first mountain-shaped part 233a be positioned at the bottom dead point of the second mountain-shaped part 221, and making the top dead point of the second mountain-shaped part 221 be positioned at the bottom dead point of the first mountain-shaped part 233a.

The terminal 100 may have a cam housing 206 for enclosing the first and second mountain-shaped parts 233a and 221. A part of the flexible printed circuit board 299 for interconnecting the circuit devices of the first and second housings 101 and 102 is wired around the first and second mountain-shaped parts 233a and 221. The cam housing 206 is formed in a hollow cylindrical shape for enclosing the first and second mountain-shaped parts 233a and 221 so as to prevent the flexible printed circuit board 299 from interfering with the first and second mountain-shaped parts 233a and 221.

In the present embodiment, each of the first and second mountain-shaped parts 223a and 221 is formed with only one top dead point and one bottom dead point. When the top dead point of the first mountain-shaped part 233a and the top dead point of the second mountain-shaped part 221 meet each other, the cam member 203 is retracted to the farthest position from the coupling member 202, and the elastic force accumulated in the elastic members 207 are maximized.

Then, if the coupling member 202 is rotated clockwise or counterclockwise, the elastic force of the elastic members 207 provides driving force in the rotating direction of the coupling member 202.

The cover members 205 are formed in a pair, and are attached to the outer peripheral surface of the hinge housing 201, so that the cover members 205 close the flat portion on the outer peripheral surface of the hinge housing 201, except a space through which the first mountain-shaped part 233a can be located into the hinge housing 201. Meanwhile, an inference protrusion 251 protrudes from a cover member 205, wherein the interference protrusion 251 maintains in the protrusion state on the outer peripheral surface of the hinge housing 201. In addition, a pair of interference grooves 127 is formed at the opposite sides of the first mountain-shaped part 233a on the outside of an edge of the second housing 102 to correspond to the interference protrusion 251.

While the second housing 102 is being rotated about the second hinge axis H2, the interference protrusion 251 may be positioned within any of the interference grooves 127. At a position where the interference protrusion 251 interferes with the inner wall of the interference groove 127 within which the interference protrusion 251 is positioned, the second housing 102 cannot be rotated about the second hinge axis H2 and is stopped. That is, as the interference protrusion 251 interferes with the inner wall of the interference groove 127, the rotating range of the second housing 102 about the second hinge axis H2 is limited.

Even if the second housing 102 is rotated about the second hinge axis H2, the user may use the terminal 100 in a state in which the second housing 102 is positioned parallel to the first hinge axis H1. Therefore, in the present embodiment, the second housing 102 of the terminal 100 is set to be rotatable within the range of 180 degrees, and the limitation of the rotating range can be determined by the arrangement of the interference protrusion 251 and the interference grooves 127.

Figure 11:
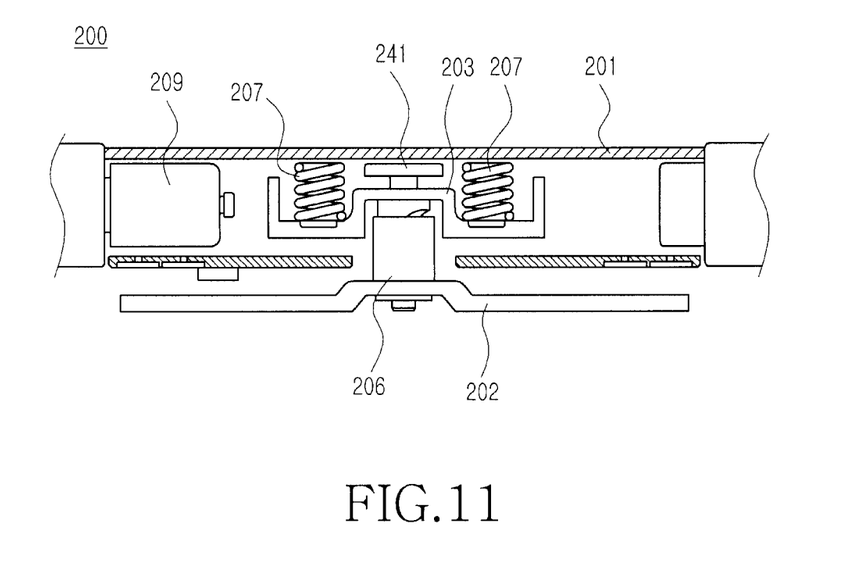
FIG. 11 is a cross-sectional view showing the internal construction of the hinge apparatus of FIG. 2 in the assembled state.
Figure 12:
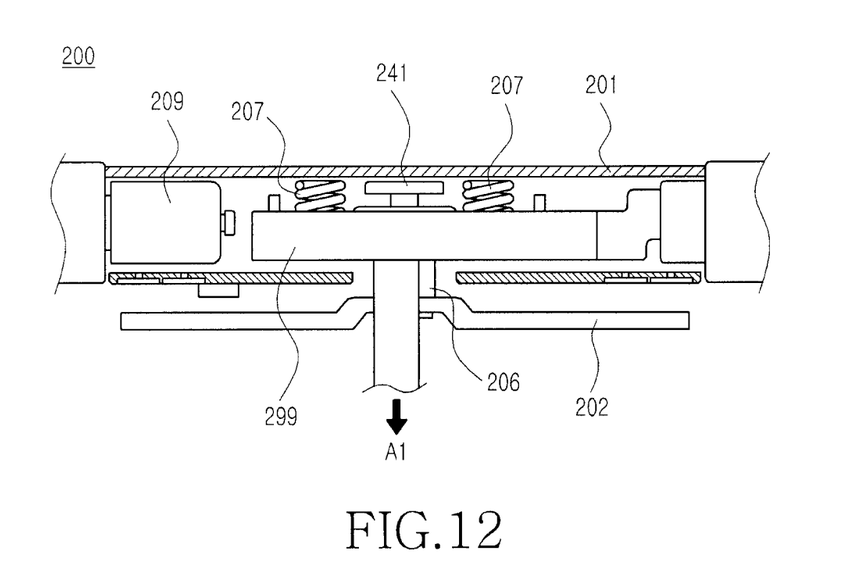
FIG. 12 is a cross-sectional view showing the flexible printed circuit board wired through the hinge apparatus of FIG. 11.

Now, the wiring arrangement of the flexible printed circuit board 299 for interconnecting the circuit devices of the first and second housings 101 and 102 will be described with reference to FIGS. 11 to 13.

Figure 13:
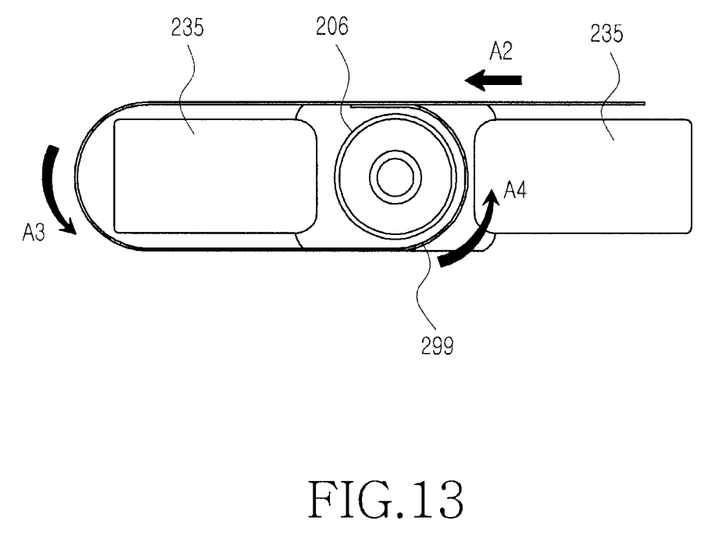
FIG. 13 is a top plan view showing the flexible printed circuit board wired in the hinge apparatus of FIG. 11.

The flexible printed circuit board 299 is introduced into the hinge housing 201 through the hinge dummy 291 (as shown by arrow A2 in FIG. 13). In the interior of the hinge housing 201, the flexible printed circuit board 299 extends to wrap a support body 235 (arrow A3), then extends to wrap a part of the first and second mountain-shaped parts 233a and 221, in particular a part of the cam housing 206 (arrow A4).

At this time, the flexible printed circuit board 299 is preferably wired by at least 180 degrees at the part extending to wrap the first and second mountain-shaped parts 233a and 221. This is to prevent tension from being applied to the flexible printed circuit board even if the second housing 102 is rotated about the second hinge axis H2. After wrapping the first and second mountain-shaped parts 233a and 221, the flexible printed circuit board 299 extends in the direction of the second hinge axis (in the direction of arrow A1 in FIG. 12) and is then introduced into the second housing 102.

Although the present embodiment exemplifies a construction in which the flexible printed circuit board 299 extends to wrap one of the support bodies 235 of the cam member 203, the flexible printed circuit board 299 may extend over 360 degrees while being wired to wrap only the first and second mountain-shaped parts 233a and 221. That is, the flexible printed circuit board 299 may be wired in such a manner that the part extending in the direction indicated by arrow A3 is wired to directly face the first and second mountain-shaped parts 233a and 22a or the outer peripheral surface of the cam housing 206, rather than extending to wrap any of the support bodies. This may be executed by a person skilled in the art through proper selection in consideration of a marginal length of the flexible printed circuit board 299 required according to the rotation of the second housing 102 or the like, when manufacturing practical products.

FIG. 14 shows the second housing 102 opened by pivoting about the first hinge axis H1, and FIG. 15 shows the second housing 102 of FIG. 14 in the state in which its front and rear sides are reversed. As shown in FIG. 15, by pivoting the second housing 102 about the hinge axis H1 in the state in which the display device 121 of the second housing 2 is positioned at the same orientation with the other side of the first housing after the terminal 100 is opened, the second housing 102 may be folded to the first housing with the display device 121 being exposed. Therefore, the user may use the terminal 100 like a bar-type terminal.

As the coupling member 202 faces and is in contact with a side wall of the second housing, the display device 121 may take a size substantially corresponding to the entire area provided by one side of the terminal 100. That is, the terminal 100 may use the display installation area allowed by the second housing 102 purely for installing only a display device.

In a portable terminal equipped with a hinge apparatus having the construction as described above, a coupling member is fixed to one side wall or an inner wall of the second housing, so as to reduce the space for the coupling member within the second housing. As a result, it is possible to secure a sufficient space for mounting parts. Especially, when the second housing has a display device mounted on the one side thereof, it is possible to freely determine the location of the display device on the second housing.

Further, even in the case of the portable terminal including a pair of housings, by opening the second housing, reversing the front and rear sides of the second housing, and then folding the second housing to the first housing, it is possible to keep the display device being opened, thus enabling a convenient viewing of a moving picture. Moreover, it is possible to easily perform the wiring of a flexible printed circuit board through the internal surface of the hinge housing without damage to the flexible printed circuit board or the portable terminal.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A portable terminal comprising:
   a first housing;
   a second housing coupled to the first housing via a hinge device, the second housing pivoting about a first axis toward or away from the first housing to be closed or opened and rotating about a second axis, the second axis extending perpendicular to the first axis; and
   the hinge device including:
   a hinge housing extending along the direction of the first axis and coupled to the first housing in such a manner that the hinge housing is rotated about the first hinge axis on the first housing;
   a coupling member anchored to the second housing and coupled to the hinge housing to be rotatable about the second axis, wherein while the hinge housing is being rotated about the first hinge axis, the coupling member rotates around the first hinge axis in a state in which one side of the coupling member is in contact with an outer peripheral surface of the hinge housing;
   a coupling shaft extending along a direction of the second hinge axis and having one end fastened to the hinge housing, and an anchoring member anchored to the other end of the coupling shaft, the anchoring member being anchored to be faced to the other side of the coupling member in a state in which the coupling shaft extends through the opposite sides of the coupling member, thus allowing the coupling member to be tied to the coupling shaft;
   a cam member received within the hinge housing for reciprocating in the direction of the second hinge axis, the coupling shaft extending through the cam member; and
   one or more elastic members, which are supported by the inner wall of the hinge housing and the cam member in such a manner that the elastic members force the cam member against the coupling member.

2. The portable terminal as claimed in claim 1, wherein the cam member has a body formed with a first mountain-shaped part, and support bodies extending from the opposite sides of the body away from each other, the elastic members being arranged at the opposite sides of the body and supported by the support bodies, respectively.

3. The portable terminal as claimed in claim 2, wherein the coupling member has a second mountain-shaped part formed on said one side of the coupling member and coming into slide contact with the first mountain-shaped part, the first and second mountain-shaped parts converting the elastic force of the elastic members into a rotation force for rotating the coupling member.

4. The portable terminal as claimed in claim 3, wherein the hinge device further comprises a cam housing interposed between the coupling member and the cam member, the cam housing being installed to enclose the outer peripheries of the first and second mountain-shaped parts.

5. The portable terminal as claimed in claim 4, further comprising a flexible printed circuit board extending from the first housing and being wired to the second housing, the flexible printed circuit board extending to wrap at least the outer peripheries of the first and second mountain-shaped parts in a range of 180 degrees, so that a part of the flexible printed circuit board is wired to the interior of the hinge housing.

6. The portable terminal as claimed in claim 3, further comprising a flexible printed circuit board extending from the first housing and being wired to the second housing, the flexible printed circuit board extending to wrap at least the outer peripheries of the first and second mountain-shaped parts in a range of 180 degrees, so that a part of the flexible printed circuit board is wired to the interior of the hinge housing.

7. The portable terminal as claimed in claim 6, wherein the flexible printed circuit board is introduced into the hinge housing from the first housing, the flexible printed circuit board extending to wrap a part of an outer periphery of the cam member and then extending to wrap the outer peripheries of the first and second mountain-shaped parts.

8. The portable terminal as claimed in claim 3, wherein the hinge device further comprises an opening extending along the direction of the first hinge axis on the outer peripheral surface of the hinge housing, and a cover member anchored to the outer peripheral surface of the hinge housing to close the opening, the cam member being assembled to the interior of the hinge housing through the opening.

9. The portable terminal as claimed in claim 2, wherein the hinge device further comprises one or more first support protrusions extending from the support bodies opposite to the first mountain-shaped part, the elastic members being coil springs wound around the first support protrusions, respectively.

10. The portable terminal as claimed in claim 9, wherein the hinge device further comprises one or more second support protrusions extending from the inner wall of the hinge housing along the direction of the second hinge axis, the second support protrusions being inserted in the first support protrusions to be capable of reciprocating so as to limit the rotation of the cam member and to guide the reciprocating movement of the cam member.

11. The portable terminal as claimed in claim 2, wherein the hinge device further comprises an opening extending along the direction of the first hinge axis on the outer peripheral surface of the hinge housing, and a cover member anchored to the outer peripheral surface of the hinge housing to close the opening, the cam member being assembled to the interior of the hinge housing through the opening.

12. The portable terminal as claimed in claim 1, wherein the hinge device further comprises a hinge module received at an end portion of the hinge housing, one end of the hinge module being tied to the first housing so that the hinge housing is rotated about the first hinge axis.

13. The portable terminal as claimed in claim 1, wherein the hinge device further comprises an opening extending along the direction of the first hinge axis on the outer peripheral surface of the hinge housing, and a cover member anchored to the outer peripheral surface of the hinge housing to close the opening, the cam member being assembled to the interior of the hinge housing through the opening.

14. A portable terminal comprising:
a first housing;
a second housing coupled to the first housing via a hinge device, the second housing pivoting about a first axis toward or away from the first housing to be closed or opened and rotating about a second axis, the second axis extending perpendicular to the first axis; and
the hinge device including:
a hinge housing extending along the direction of the first axis and coupled to the first housing in such a manner that the hinge housing is rotated about the first hinge axis on the first housing;
a coupling member anchored to the second housing and coupled to the hinge housing to be rotatable about the second axis, wherein while the hinge housing is being rotated about the first hinge axis, the coupling member rotates around the first hinge axis in a state in which one side of the coupling member is in contact with an outer peripheral surface of the hinge housing; and
a cam member disposed within the hinge housing, wherein as the first and second housings are rotated relative to one another the cam member is moved in a direction away from the coupling member generating a driving force for completing the rotation.

15. The portable terminal as claimed in claim 14, wherein the hinge device further comprises an opening extending along the direction of the first hinge axis on the outer peripheral surface of the hinge housing, and a cover member anchored to the outer peripheral surface of the hinge housing to close the opening, the cam member being assembled to the interior of the hinge housing through the opening.

16. The portable terminal as claimed in claim 15, wherein the hinge device further comprises a seating surface formed on an inner wall of the hinge housing exposed through the opening, and a seating member formed on one end of the coupling shaft, the seating member being fixed to the seating surface.

17. The portable terminal as claimed in claim 16, wherein the seating surface and the seating member are formed in an oval or polygonal shape.

18. The portable terminal as claimed in claim 15, wherein the hinge device further comprises an interference protrusion formed on a side of the cover member and extending to the outer peripheral surface of the hinge housing, and interference grooves formed on the second housing, the interference protrusion interfering with the inner walls of the interference grooves so as to limit the rotating range of the second housing about the second hinge.

19. The portable terminal as claimed in claim 18, wherein the rotating range of the second housing about the second hinge axis is 180 degrees.

* * * * *